May 31, 1949.   F. A. GRUETJEN   2,471,486
METHOD OF CONSTRUCTING PROPELLER FOIL PLATES
Filed Oct. 23, 1943   2 Sheets-Sheet 1
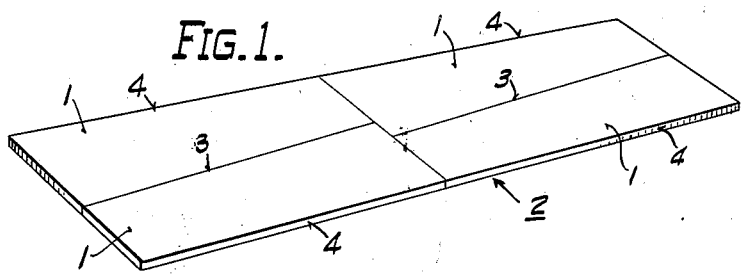
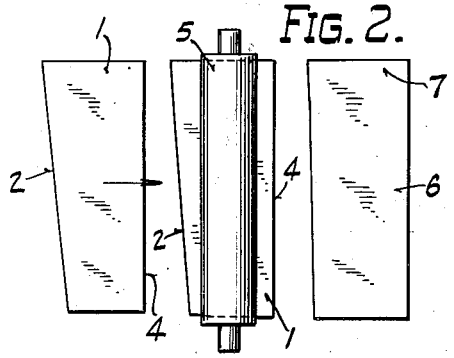
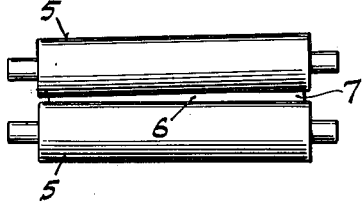
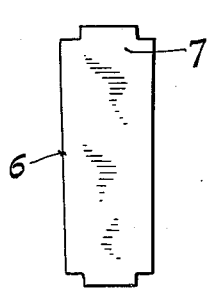
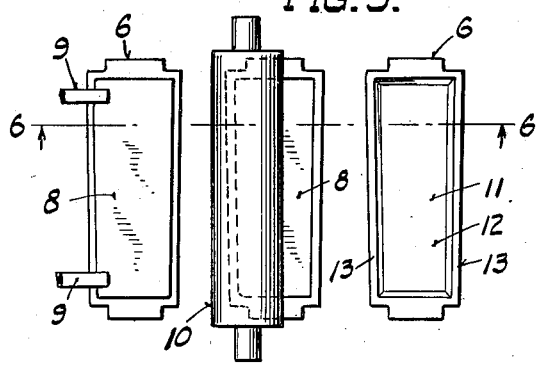
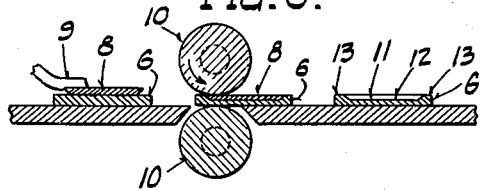
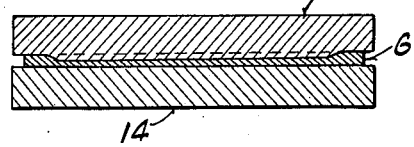
Frederick A. Gruetjen
INVENTOR.
BY *Elwin A. Andrus*
ATTORNEY.

May 31, 1949. F. A. GRUETJEN 2,471,486
METHOD OF CONSTRUCTING PROPELLER FOIL PLATES
Filed Oct. 23, 1943 2 Sheets-Sheet 2
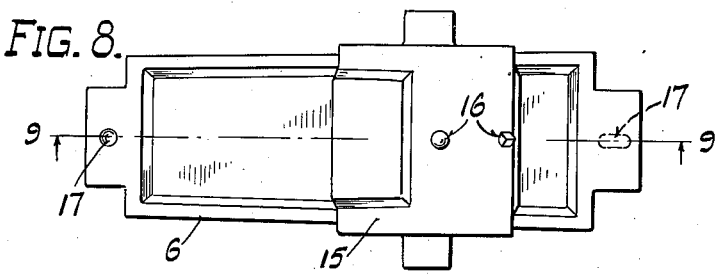
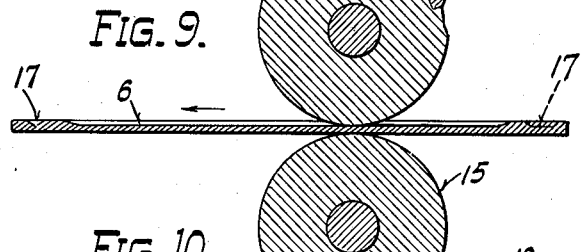
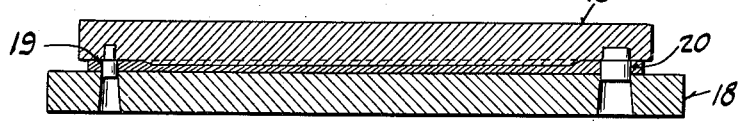
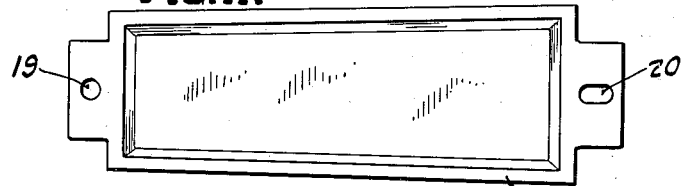
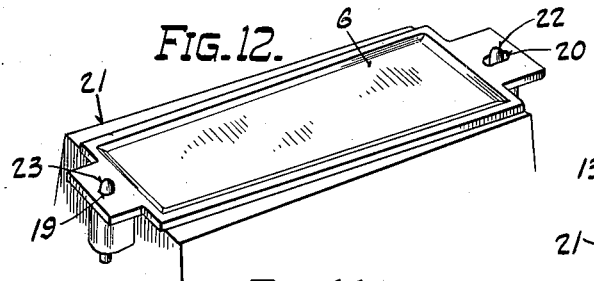
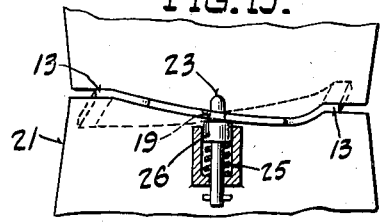
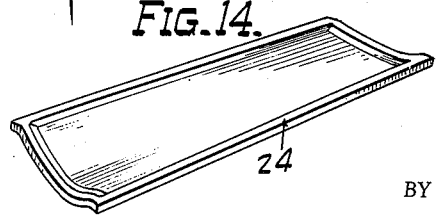
Frederick A. Gruetjen
INVENTOR.
BY Elwin A. Andrus
ATTORNEY.

Patented May 31, 1949

2,471,486

UNITED STATES PATENT OFFICE 2,471,486

METHOD OF CONSTRUCTING PROPELLER FOIL PLATES

Frederick A. Gruetjen, Milwaukee, Wis., assignor to A. O. Smith Corporation, Milwaukee, Wis., a corporation of New York Application October 23, 1943, Serial No. 507,366

4 Claims. (Cl. 29—156.8)

This invention relates to a method of forming foil plates for welded hollow steel propeller blades and has found application in the manufacturing of blades having separate leading and trailing edge forgings electric flash welded to the longitudinal edges of foil plates as set forth in the co-pending application of William C. Heath, Serial No. 480,682, filed March 26, 1943, for Electrically welded hollow steel propeller blade and method of making the same, and assigned to the assignee of the present invention.

The foil plates for such a blade should be tapered in thickness longitudinally and have thick edge portions for flash welding, the central portion of the plates embodying the pitch twist of the corresponding foil surfaces of the blade. The thick edge portions of the blade should have straight parallel elements perpendicular to the respective edges to provide for flashing away of metal during flash welding.

The object of the present invention is to provide a method of making such a foil plate, which is accurate and adaptable to mass production operations whereby successive foil plates may be made with the same accuracy throughout.

Another object is to eliminate waste insofar as possible in the manufacture of the foil plates.

Another object is to prepare a foil section for flash welding to provide the same as an integral part of a propeller blade.

The invention is illustrated in the accompanying drawings in which:

Figure 1 is a perspective view of a metal strip from which a plurality of foil plates are blanked;

Fig. 2 is a plan view showing the taper cross rolling of a foil plate blank;

Fig. 3 is a front view showing the rolling of Fig. 2;

Fig. 4 is a plan view of a blank after taper rolling in the manner of Figs. 2 and 3 and after trimming;

Fig. 5 is a plan view of cross pre-contour rolling of the blank;

Fig. 6 is a section taken on line 6—6 of Fig. 5;

Fig. 7 is a longitudinal section of a die pressing operation for flattening the blank of Fig. 6;

Fig. 8 is a plan view illustrating the final contour rolling of the blank longitudinally;

Fig. 9 is a sectional view of the operation of Fig. 8 taken on line 9—9 of Fig. 8;

Fig. 10 is a longitudinal central section of a die pressing operation for flattening the blank and showing the punching of index holes at the ends of the blank;

Fig. 11 is a top plan view of the blank after the operation of Fig. 10 and trimming of the blank;

Fig. 12 is a perspective view showing the positioning of the blank on a die having indexing dowels;

Fig. 13 is an end elevation illustrating the coining and final forming operation of the blank on the die of Fig. 12; and Fig. 14 is a perspective view of the final foil plate ready for flash welding to other parts of the propeller blade.

In carrying out the invention, the blank 1 is first trimmed from a strip 2 of rolled plate metal and has one longitudinal edge 3 diagonal and the other edge 4 perpendicular to the end edges to provide a blank of progressively tapered width with one end wider than the other.

The blank 1 is then cross taper rolled as shown in Figs. 2 and 3, the perpendicular side 4 of the blank entering the rolls 5 first. The rolls 5 are set to diminish the thickness of the blank on a taper longitudinally of the rolls with the narrower end of the blank thinned the most. By utilizing a blank of the form described and inserting it in the rolls as described, the flow of the metal resulting from the thinning of the blank at its narrowest end widens the blank at this end and produces a blank 6 which is nearly rectangular and which is tapered in thickness, generally from one end to the other. In actual practice, however, it is preferred to have a substantial portion 7 of the thick end of uniform thickness as indicated in Figs. 3 and 4.

After cross taper rolling and trimming, the blank 6 is cross pre-contour rolled as shown in Figs. 5 and 6. In this operation an insert die plate 8 is centered on the blank and held thereon by the feeder clips 9 as the two are fed together into the rolls 10. The clips 9 prevent displacement of plate 8 as the edge of the plate enters the rolls, and the clips automatically release the plate 8 after the rolling operation has proceeded sufficiently to seat the plate 8 in the blank 6. The rolls 10 press the contoured lower surface of plate 8 into the top surface of the blank, and when the plate 8 is removed, a cavity 11 appears in the upper side of the blank providing a thin central portion 12 with thick edge portions 13 all around the blank.

By cross rolling first to form the major thinning of the center of the blank, as distinguished from longitudinally rolling for this purpose, there are no tears along the edges due to expansion stresses and the central thin portion is free from waves and buckling.

The blank 6 is next bumped flat between dies 14, as illustrated in Fig. 7.

The final contour rolling of the blank is done by longitudinal rolling between a pair of contour rolls 15 shown in Figs. 8 and 9. The lower roll is ordinarily cylindrical while the upper roll has a die face embodying the contour of the final shape for the upper surface of the blank. Indexing buttons 16 are provided at each end of the die face of the upper roll to form indexing depressions 17 at the ends of the blank. The blanks may be successively fed automatically to the rolls and indexed therewith by any suitable feed mechanism.

In the final contour rolling operation, the thin end of the blank 6 is forward so that it enters the rolls first.

If desired, the pre-contour cross rolling of the blank may be done in contour rolls of the same kind as those employed in the final contour rolling operations instead of employing the die plate 8.

After final contour rolling, the blank is bumped flat between a pair of dies 18 in a suitable press. In this operation the side edges of the blank may be trimmed leaving an extra length at each end. A central indexing hole 19 is punched in the extra length portion at one end, and a corresponding indexing slot 20 is punched in the extra length portion at the other end. The indexing hole 19 and slot 20 will be located directly upon the indexing depressions 17 and will be substituted for the depressions.

In placing the blank upon the supporting die 21 of the final coining press, the blank is slid longitudinally until the dowel 22 at one end of the die engages the bottom of slot 20. Then the hole 19 registers with a second dowel 23 at the other end of the die and the blank drops in place as shown in Fig. 12.

The final coining of the blank, as illustrated in Fig. 13, gives the pitch twist of the blade to the central portion 12 of the blank, and at the same time forms and coins the edge portions 13 to extend in a direction suitable for flash welding to adjacent parts of the blade. As illustrated, the edge portions 13 will contain parallel elements extending substantially perpendicular to the edges and substantially parallel to the medial horizontal transverse plane of the blank.

After coining of the blank as above described, the ends are trimmed to final dimensions, removing the indexing hole 19 and slot 20, leaving a foil plate 24 of the general shape indicated in Fig. 14. Various additional operations, including those of heat treating and inspection, may be applied to the blank at various stages in the making of the foil plate.

In the construction illustrated, the rolling and forging operations should be carried out while the blank is hot, and with low alloy high strength steel it is preferable to heat the blank to about 2300° F. for each rolling operation and for the final coining and forming operation. Depending upon the composition of the steel, the trimming and bumping operations may be carried out while the blank is cold or only partially heated. Where an alloy steel is employed, these operations should follow immediately after rolling so that the blank is still hot from rolling.

In the final coining operation illustrated in Fig. 13, the dowels 22 and 23 are preferably supported on springs 25 and have shoulders 26 for initially supporting the blank above the die 21. This prevents undue cooling of the blank on its bottom side by contact with die 21 and provides for a more uniform temperature in the blank at the time the dies come together to press the blank to shape.

Various embodiments of the invention may be employed within the scope of the accompanying claims.

I claim:

1. In the forming of foil plates for large hollow steel propeller blades and the like, the cross taper rolling of a blank of substantially uniform thickness to provide a partially formed blank of tapered thickness from end to end, cross pre-contour rolling of the tapered blank to provide a relatively thin central portion surrounded by thick edge portions free from tears and surface defects from longitudinal flow of the metal, longitudinally rolling the pre-contoured blank to final dimensions, trimming the blank, and finally coining and die pressing the blank to embody the pitch twist of the blade and an air foil shape of a corresponding surface of the blade with substantially straight thick edge portions adapted for flash welding to abutting edges of adjacent blade parts.

2. In the forming of foil plates for large hollow steel propeller blades and the like, cross pre-contour rolling of a longitudinally tapered blank to provide a relatively thin central portion surrounded by thick edge portions free from tears and surface defects from longitudinal flow of the metal, longitudinally rolling the pre-contoured blank to final dimensions, trimming the blank, and finally coining and die pressing the blank to embody the pitch twist of the blade and an air foil shape of a corresponding surface of the blade with substantially straight thick edge portions adapted for flash welding to abutting edges of adjacent blade parts.

3. The method of preparing a foil section of a hollow steel propeller blade for flash welding to other sections of the blade without substantial loss of metal of the initial blank, which comprises pre-contour cross-rolling the central portion of the blank to substantially the final thicknesses of the completed foil section by a generally major transverse flow of metal to provide edges of greater cross-section than the body thereof free from tears and surface defects and of predetermined dimensions for flash welding to adjacent sections of the blade without substantial trimming, and then finally longitudinally contour rolling the blank with a substantially lesser flow of metal to complete the shaping of the blank.

4. The method of preparing a foil section of a hollow steel propeller blade for flash welding to other sections of the blade without substantial loss of metal of the initial blank, which comprises cross-rolling a blank of uniform thickness to produce a substantially rectangular blank tapered from end to end, pre-contour cross-rolling the central portion of the blank to substantially the final thicknesses of the completed foil section by a generally major transverse flow of metal to provide edges of greater cross-section than the body thereof free from tears and surface defects and of predetermined dimensions for flash welding to adjacent sections of the blade without substantial trimming, and then finally longitudinally contour rolling the blank with a substantially lesser flow of metal to complete the shaping of the blank.

FREDERICK A. GRUETJEN.

REFERENCES CITED

The following references are of record in the file of this patent:

UNITED STATES PATENTS

| Number | Name | Date |
| --- | --- | --- |
| 471,544 | Hall | Mar. 29, 1892 |
| 1,035,545 | Dake | Aug. 13, 1912 |

(Other references on following page)

UNITED STATES PATENTS

| Number | Name | Date |
|---|---|---|
| 1,071,846 | Wilmot | Sept. 2, 1913 |
| 1,369,399 | Christensen | Feb. 22, 1921 |
| 1,652,860 | Heinle | Dec. 13, 1927 |
| 1,842,466 | Weick | Jan. 26, 1932 |
| 2,007,775 | Smith | July 9, 1935 |
| 2,075,066 | Smith | Mar. 30, 1937 |
| 2,214,338 | McKee | Sept. 10, 1940 |
| 2,231,888 | Couch | Feb. 18, 1941 |
| 2,235,032 | McKee | Mar. 18, 1941 |
| 2,315,810 | Nelson | Mar. 6, 1943 |
| 2,364,610 | Archer | Dec. 12, 1944 |

FOREIGN PATENTS

| Number | Country | Date |
|---|---|---|
| 73,918 | Germany | Mar. 29, 1892 |
| 363,929 | Germany | Nov. 15, 1922 |
| 704,659 | Germany | Apr. 3, 1941 |